United States Patent [19]
Jackson

[11] Patent Number: 4,896,448
[45] Date of Patent: Jan. 30, 1990

[54] BIRD DECOY WITH MOTOR DRIVE WINGS

[76] Inventor: Larry L. Jackson, Rt. 3, Sterling, Colo. 80751

[21] Appl. No.: 288,034
[22] Filed: Dec. 20, 1988
[51] Int. Cl.⁴ .......................................... A01M 31/06
[52] U.S. Cl. .......................................................... 43/3
[58] Field of Search ............................................... 43/3

[56] References Cited

U.S. PATENT DOCUMENTS

| | | | |
|---|---|---|---|
| 547,553 | 10/1895 | Keller | 43/3 |
| 2,747,316 | 5/1956 | Benedetto | 43/3 |
| 3,435,550 | 4/1969 | Carlson | 43/3 |
| 4,128,958 | 12/1978 | Snow | 43/3 |

Primary Examiner—M. Jordan
Attorney, Agent, or Firm—Gregg I. Anderson

[57] ABSTRACT

A bird decoy including a body and a flapping mechanism mounted therein is disclosed. The flapping mechanism moves a pair of wings, which oscillate with respect to the body. The flapping mechanism includes a battery-operated motor, which creats a rotary motion, which rotary motion is transformed into reciprocal motion and which is in turn transformed into pivotal or oscillatory motion about a pair of pivot points. A method of the invention shows how a bird decoy body can be modified to include the flapping mechanism.

5 Claims, 3 Drawing Sheets

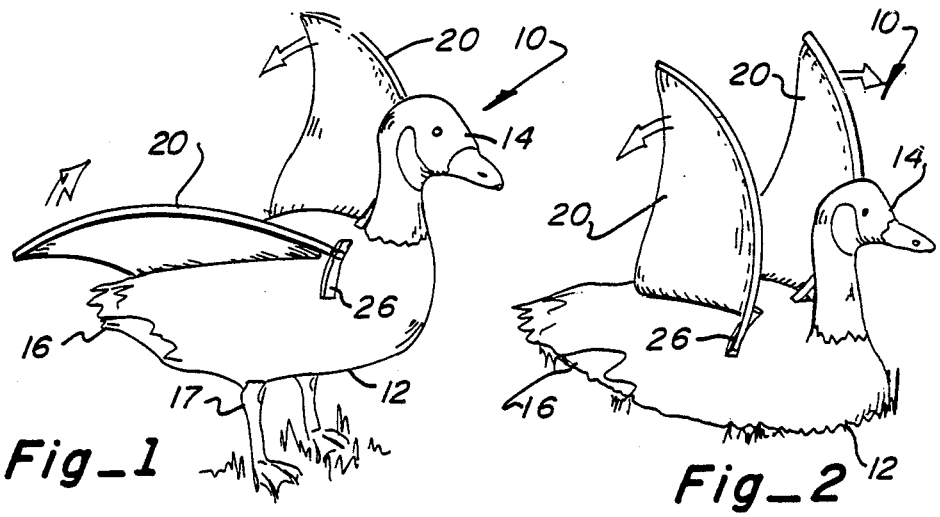
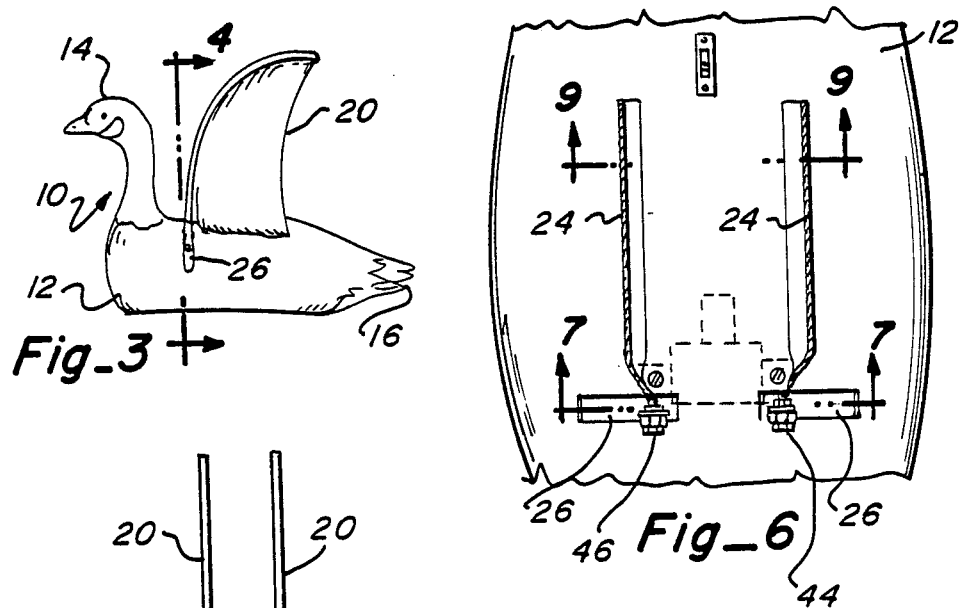
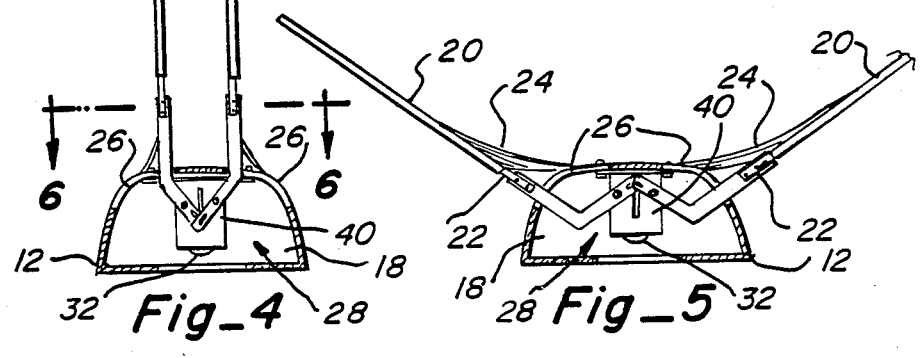

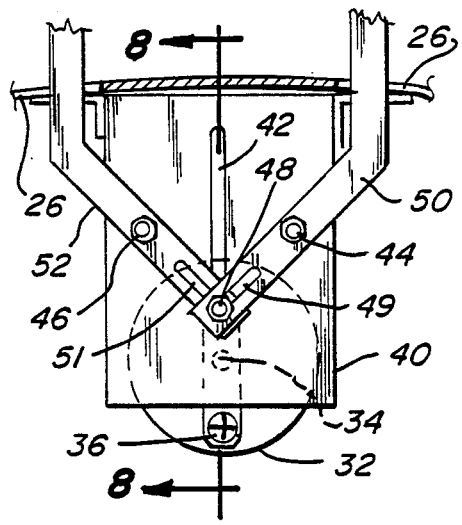
Fig_7
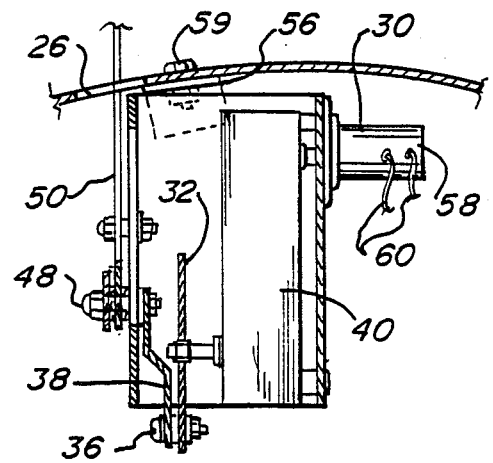
Fig_8
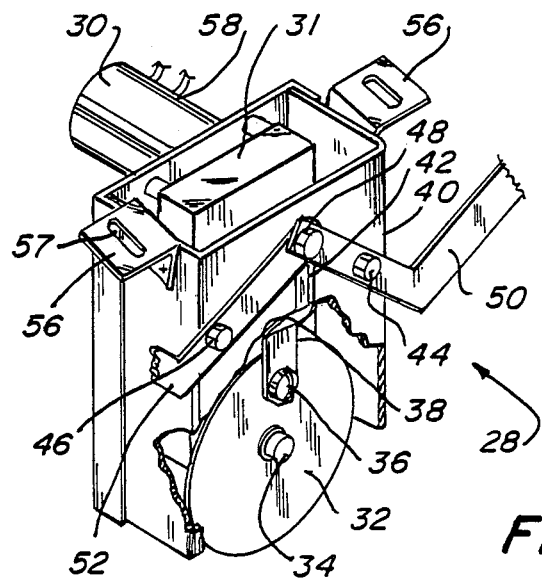
Fig_10
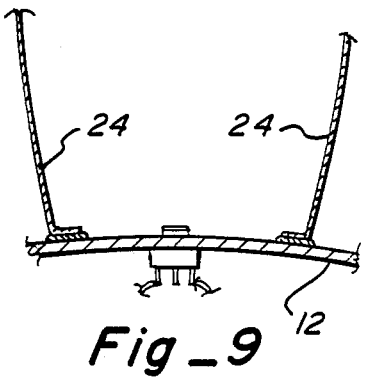
Fig_9
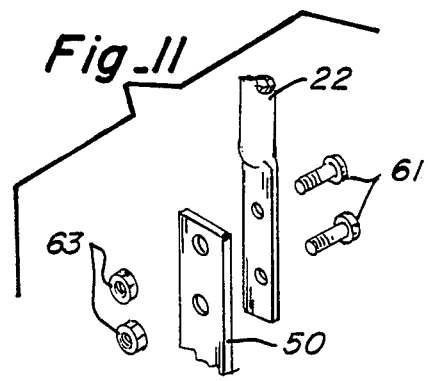
Fig_11

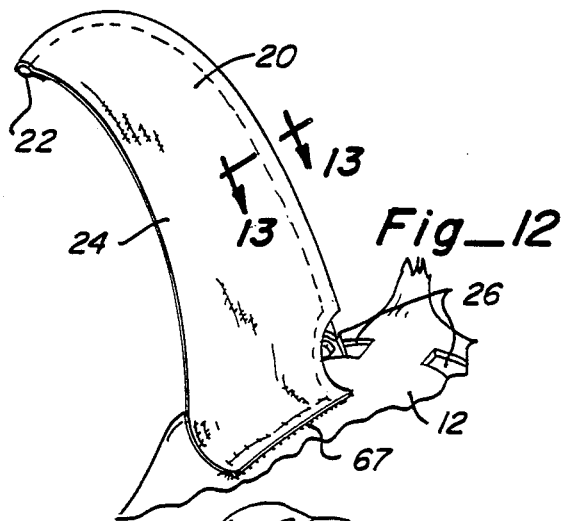
Fig_12
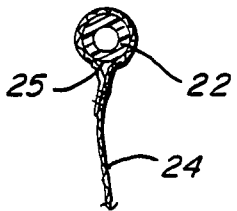
Fig_13
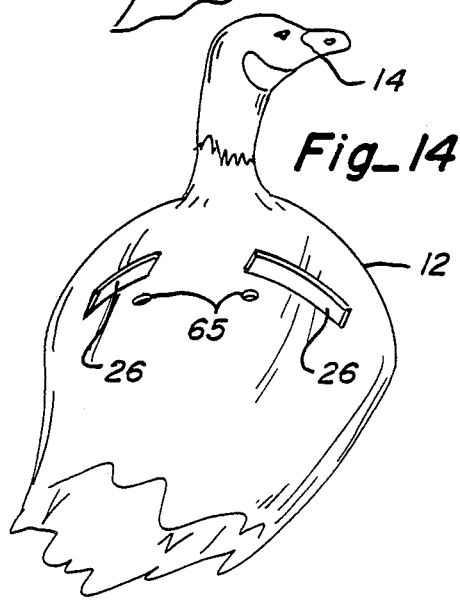
Fig_14
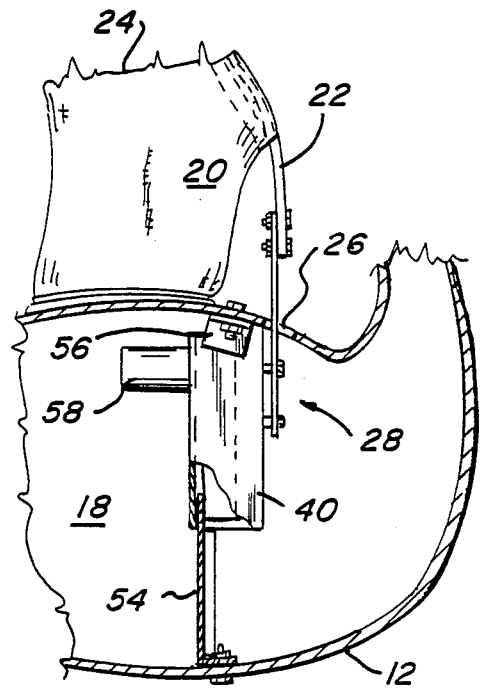
Fig_15
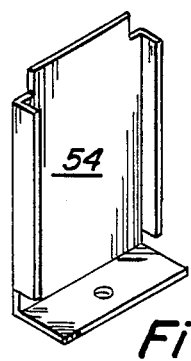
Fig_16

BIRD DECOY WITH MOTOR DRIVE WINGS

BACKGROUND OF THE INVENTION

FIELD OF THE INVENTION

The present invention relates to bird decoys. More particularly, the invention relates to bird decoys having moving wings to assist in attracting birds.

DESCRIPTION OF THE PRIOR ART

Bird decoys, in the form of geese, ducks or other game birds, have long been used by hunters to attract birds, water foul in particular. Bird decoys are known to be of several types. Some float on the water, others are hollow and are adapted to lie in low brush, while still others have feet to give the appearance of standing on low brush or other solid land terrain. Various sizes are also available, larger bird decoys being used to attract high flying birds to the ground.

It is also known to enhance the ability of a bird decoy to attract birds by incorporating a flagging action from movable wings mounted on the decoy. However, such previous attempts to impart a flagging action to the wings have been cumbersome and, therefore, ineffective.

SUMMARY OF THE INVENTION

It is the principal object of the present invention to provide a bird decoy with movable wings that is easily mounted to an existing bird decoy.

In accordance with the object of the invention, a bird decoy of conventional construction is modified by incorporating a flapping mechanism into a hollow body of the bird decoy. Wings are attached to the flapping mechanism through slots formed in the body. A battery is connected to a motor to actuate the flapping mechanism and move the wings within the slots relative to the body of the bird decoy. Each of the wings pivot about a separate pivot pint, oscillating through a predefined arc.

The flapping mechanism includes a rotary drive wheel which is rotated by the motor and connected to a drive link, which link reciprocates along a slot. The drive link is slideably connected to first and second arms of the wings, each pivotally connected at fixed pivot points to the body. Each of the arms is associated with a wing of the bird decoy.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a perspective view of a bird decoy of the present invention, movable wings of the bird decoy shown in a downward position, prior to moving upward.

FIG. 2 is a perspective view similar to FIG. 1, the bird decoy shown in a nested position, movable wings of the bird decoy shown in an upward position, prior to moving downward.

FIG. 3 is a side elevational view of the invention shown in FIG. 2.

FIG. 4 is a sectional view taken in the plane of line 4—4 of FIG. 3.

FIG. 5 is a sectional view similar to FIG. 4, movable wings of the bird decoy shown in a downward position.

FIG. 6 is an enlarged sectional view taken in the plane of line 6—6 of FIG. 4.

FIG. 7 is a sectional view taken in the plane of line 7—7 of FIG. 6.

FIG. 8 is a sectional view taken in the plane of line 8—8 of FIG. 7.

FIG. 9 is a sectional view taken in the plane of line 9—9 of FIG. 6.

FIG. 10 is a perspective view of a flapping mechanism of the invention shown in FIG. 1, parts being broken away for clarity.

FIG. 11 is an exploded perspective view of a connection between the flapping mechanism and a wing tube of the present invention.

FIG. 12 is a fragmentary perspective view of the movable wing mounted to a body of the present invention.

FIG. 13 is a fragmentary sectional view taken in the plane of line 13—13 of FIG. 12.

FIG. 14 is a top perspective view of a body of the bird decoy of the present invention, the movable wings being removed.

FIG. 15 is a fragmentary sectional view of an interior of the body with the flapping mechanism and its connection to the movable wings.

FIG. 16 is a perspective view of a mounting plate for the flapping mechanism.

DESCRIPTION OF THE PREFERRED EMBODIMENT

A bird decoy 10 is shown in FIGS. 1, 2, and 4 to include a body 12 having a head 14 and a tail 16. The bird decoy is shown in FIG. 1 in a standing position with legs 17 and in FIGS. 2 and 3 in a recumbent or nesting position.

The body 12 includes a hollow interior 18 (FIG. 15) in which interior 18 a flapping mechanism 28 is mounted to the body 12. The flapping mechanism 28 projects through wing slots 26 formed in the body 12 and is connected to movable wings 20. A motor 30 (FIG. 10) is connected by conductors 60 to a battery (not shown), which can be either six volts or twelve volts. Energizing the motor 30 causes the flapping mechanism 28 to impart a reciprocating motion to the wings 20, causing the movable wings 20 to oscillate from an upward position (FIGS. 2 and 4) to a downward position (FIGS. 1 and 5). Twelve to fourteen flaps per minute are generated with a six-volt battery, and a twelve-volt battery generates twice that amount.

The movable wings 20 each include a laterally and rearwardly extending wing tube 22 (FIG. 12 and 13) threaded into a nylon wing cover 24. The wing cover 24 includes a sewn pocket 25 which threadably receives the tube 22 to give the wing cover 24 the shape of the wing 20.

The flapping mechanism 28 (FIGS. 4 through 10) includes a drive wheel 32 interconnected to the motor 30 by a gear box 31. A motor connection 34 secures the drive wheel 32 to the gear box 31. The motor 30 delivers rotary motion through the gear box 31 to the drive wheel 32. At an outer periphery of the drive wheel 32, a drive link connection 36 pivotally connects the drive wheel 32 to one end of a drive link 38. The other end of the drive link 38 reciprocates along drive link slot 42 formed in gear housing 40. The other end of the drive link 38 is connected by a slide connection 48 (FIG. 7) to a first wing arm 50 and a second wing arm 52. The slide connection 48 is achieved by forming a wing slot 49 in first wing arm 50, and a like wing slot 51 in second wing arm 52. As the other end of the drive link 38 reciprocates along the slot 42 the wing arms 50 and 52 pivot about first pivot 44 and second pivot 46 respectively. The wing arms 52 are pivotally connected to the housing 40 at the first pivot 44 and the second pivot 46. The wing slots 49 and 51 in the wing arms 50 and 52, respectively, allow the slide connection 48 to reciprocate vertically up and down in drive link slot 42. The wing arms 50 and 52 pivotally move with respect to the housing 40 and the decoy 10 about pivots 44 and 46.

The housing 40 is connected to the motor 30. Mounting tabs 56 have slots 57 formed therein to connect to the body 12 through screws 59. The wing arms 50 and 52 extend through the slots 26 formed in the body 12. The wing tubes 22 are connected to the wing arms 50 and 52 by bolts 61 and nuts 63. (FIG. 11).

For larger bird decoys 10, a mounting plate 54 is included to support the housing 40 at an elevated position above the hollow body 12. (FIG. 15).

In operation, the drive wheel 32 is rotated by the motor 30 reciprocating the slide connection 48 in the housing 40, transforming rotary motion into reciprocal motion at the slide connection 48. The slide connection 48 concurrently moves along the slots 49 and 51 in the arms 50 and 52, pivoting the wing arms 50 and 52 about the pivots 44 and 46 and transforming reciprocal motion into pivotal or oscillatory motion about the pivots 44 and 46. The connected wing tubes 20 and wing coverings 24 move up and down relative to the body 12 of the decoy 10, giving the appearance of flapping wings.

A method of incorporating the flapping mechanism 28 into the body 12 allows the bird decoy 10 to be created from already available parts. The first step associated with the method is locating and forming the slots 26 in the body 12. First the centerline of the hole for the head 14 is located. For a magnum body size, three inches are measured to the rear of the centerline of the hole for the head 14. An area is marked off, with a piece of tape, three and one-half inches long and one-half inch wide, the three and one-half inch measurement straddling the longitudinal centerline of the body 12. This area will not be slotted but will remain solid. (FIG. 14).

Two pieces of one inch wide by seven and one-half inch long tape are placed adjacent to the ends of the tape in the prior step for cutting slots 26. The tape is angled slightly towards the tail 16, making sure the angle is the same for each of the sides.

A razor knife is then used to cut around the edges of the tape as positioned for cutting the slots 26. The cutout pieces of the body are removed.

The flapping mechanism 28 is received with the wing arms 50 and 52 in the upward position. From the inside of the shell or body 12, the flapping mechanism is positioned so that it is centered along the longitudinal centerline of the shell or body 12 through the slots 26. Holes 65 of 5/32 inch diameter are drilled on either side of the body approximately four and one-half to five inches apart. From the top of the body 12, two ⅜th inch phillips head bolts are passed through the holes 65 and the slots 57 in the mounting tabs 56 of the flapping mechanism 28. Two locking nuts secure the flapping mechanism 28 in position.

The wing tubes 22 are attached to the wing arms 50 and 52. The wing covers 24 are then threaded onto the wing tubes 22 defining the movable wings 20 thereby. A free edge 67 of the wing 20 is glued to the body 12. (FIG. 12).

Although the present invention has been described with a certain degree of particularity, it is understood that the present disclosure has been made by way of example, and changes in detail or structure may be made without departing from the spirit of the invention, as defined in the appended claims.

I claim:

1. A bird decoy comprising in combination:
   a body having a hollow interior;
   flapping means for transferring rotary motion into reciprocal motion mounted to the interior of said body;
   motor means for imparting rotary motion to said flapping means connected to said body; and
   a pair of arms slideably connected to said flapping means and pivotally connected to said body, said arms projecting through said body to connect to wings.

2. The invention as defined in claim 1 wherein said flapping means includes a drive wheel connected to said motor means, which drive wheel is pivotally connected to one end of a drive link, said motor means mounted to a housing for said flapping means, another end of said drive link concurrently slideably connected to said pair of arms and to a slot in said housing.

3. The invention as defined in claim 1 wherein said wings each include a wing tube extending outwardly and rearwardly from said body, said wing tube threadably inserted into a wing covering, said wing covering connected along one edge thereof to said body.

4. The invention as defined in claim 1 wherein said body includes a slot for each of said wings.

5. A bird decoy including a body having a hollow interior, comprising in combination:
   a flapping mechanism positioned within and mounted to said body, said flapping mechanism including a motor providing rotary movement and transform means for transforming said rotary movement into reciprocal movement, said flapping mechanism projecting through said body to connect to a pair of moveable wings, arms of said wings slideably connected to said transform means, said arms pivotally connected to said body whereby rotary movement is transformed to reciprocal movement and reciprocal movement is transformed to pivotal movement of the wings.

* * * * *